United States Patent
Almer et al.

[11] 4,017,758
[45] Apr. 12, 1977

[54] INCANDESCENT LAMP WITH INFRARED FILTER

[75] Inventors: Friedrich Hermann Raymund Almer, Eindhoven, Netherlands; Heiner Kostlin, Aachen-Schleckheim, Germany

[73] Assignee: U.S. Philips Corporation, New York, N.Y.

[22] Filed: Mar. 28, 1975

[21] Appl. No.: 563,062

[30] Foreign Application Priority Data
Apr. 16, 1974  Netherlands .................. 7405071

[52] U.S. Cl. .............................. 313/112; 313/113; 313/220; 350/1
[51] Int. Cl.² ........................................ H01J 61/40
[58] Field of Search .......... 313/110, 111, 112, 113, 313/114; 350/1

[56] References Cited
UNITED STATES PATENTS

| | | | |
|---|---|---|---|
| 2,692,350 | 10/1954 | Arnott .................................. | 313/114 |
| 3,174,067 | 3/1965 | Bahrs .................................. | 313/112 |
| 3,188,513 | 6/1965 | Hansler .............................. | 313/112 |
| 3,209,188 | 9/1965 | Freeman ............................ | 313/110 |
| 3,279,317 | 10/1966 | Ploke ................................. | 350/1 |
| 3,288,989 | 11/1966 | Cooper .............................. | 313/110 |
| 3,325,666 | 6/1967 | Bird et al. ......................... | 313/112 |
| 3,400,288 | 9/1968 | Groth ................................. | 313/112 |
| 3,514,174 | 5/1970 | Gans et al. ....................... | 350/1 |
| 3,531,313 | 9/1970 | Dates ................................. | 350/1 |
| 3,781,077 | 12/1973 | Groth ................................. | 350/1 |

*Primary Examiner*—John Kominski
*Attorney, Agent, or Firm*—Frank R. Trifari; Robert S. Smith

[57] ABSTRACT

The thermal radiation which is emitted by an electric incandescent lamp is eliminated according to the invention by providing an incandescent lamp with a filter which transmits visible light and which reflects infrared radiation, which filter consists of an interference filter and a heavily doped metal oxide filter which is disposed at the side of the interference filter which is remote from the filament body.

14 Claims, 8 Drawing Figures

INCANDESCENT LAMP WITH INFRARED FILTER

The invention relates to an electric incandescent lamp which is provided with a filament body, lamp envelope, gas filling and filter which is transparent to visible light and which reflects infrared radiation.

The radiation which is emitted by incandescent lamps for the major part consists of thermal radiation. As a result, not only the efficiency of incandescent lamps is low, but the thermal radiation is very annoying — especially when high illumination intensities are necessary, such as in TV and film studios.

It is known to provide the lamp envelope of an electric incandescent lamp with a thin layer of metal to reflect the infrared radiation to the filament body (British patent specification No. 452,127). Such a layer of metal relfects the thermal radiation for the greater part, but is not suffficiently transparent to radiation in the visible part of the spectrum.

It has also been proposed to coat the lamp envelope with a layer of titanium oxide (British patent specification No. 703,127). However, said layer only reflects a small part of the infrared radiation, mainly that with wavelengths around $1.1 \mu m$.

According to British patent specification No. 834,087 an interference filter with a multi-layer structure is employed. However, such a filter can only reflect thermal radiation in the near infrared up to approximately $1.2 \mu m$, if it is required to be substantially fully transparent to visible radiation.

It is an object of the invention to provide an electric incandescent lamp which obviates the annoying effect of thermal radiation both in the near and far infrared.

According to the invention the electric incandescent lamp of the type mentioned in the preamble is characterized in that the filter, which is transparent to visible light and reflecting for infrared radiation, consists of an interference filter and a heavily doped metal-oxide filter with a plasma wavelength smaller than $1.4 \mu m$ which is disposed at the side of said flter which is remote from the filament body.

In this respect plasma wavelength is be understood to mean that wavelength at which an abrupt change in the optical properties of the material occurs which is caused by the free electrons in the material. The relation between plasma wavelength $\lambda_p$ and free-electron density $N_e$ is given by: $\lambda_p = A \times N_e^{-\frac{1}{2}}$, the free-electron density being expressed in $10^{21} cm^{-3}$, the wavelength in $\mu m$ and A being a material constant which equals $c/e (\pi \epsilon n_{eff})^{\frac{1}{2}}$. In this formula $c$ is the velocity of light, $e$ the elementary charge, $\epsilon$ the dielectric constant of the material and $m_{eff}$ the effective mass of the charge carrier.

Such a filter, whose selective reflection is caused by the free-electron plasma, may also be termed plasma filter or plasma edge filter.

Another object of the invention is to provide an electric incandescent lamp with a higher luminous efficiency. In a preferred embodiment of the incandescent lamp according to the invention this is achieved by disposing the filament body in the optical centre of the infrared reflecting filter.

Although the scope of the invention is not limited thereto, filters which consist of indium oxide ($In_2O_3$) which is doped with at least 7 at. percent of tin calculated for indium and which has a free-electron density of at least $10^{21} cm^{-3}$, are particularly suitable for use as a heavily-doped metal-oxide filter. Preferably, filters are used which consist of indium oxide with from 7 to 20 at. percent of tin and a free-electron density lying between $10^{21}$ and $3 \times 10^{21} cm^{-3}$. The above-mentioned material constant A is 4.0 $\mu m.cm^{3/2}$ for indium oxide.

Such filters can be made by atomizing a solution of an indium salt and a tin salt in an organic solvent with for example air or oxygen on a transparent substrate which is heated to over 400° C. For this purpose the usual salts of indium and tin, such as halogenides, specifically $InCl_3$ and $SnCl_4$, nitrate, acetyl acetonate, salts of organic acids such as acetate, palmitate, stearate, benzoate, may be employed in the usual solvents such as lower alcohols like butanol, esters like butyl acetate and hydrocarbons like toluene and benzene. Subsequently, the coated substrte is heated in an atmosphere with an oxygen partial pressure below $10^{-7}$ atm., for example at a temperature between 380° and 500° C. This may be realized by evacuating a reaction space down to $10^{-5}$ torr and subsequently filling it with a reducing gas such as hydrogen, carbon monoxide or mixtures thereof to a partial pressure of 1 to 100, preferably 5 to 50 torr per component. The coated substrate is preferably heated in an atmosphere with an oxygen partial pressure which ranges between $10^{-7}$ atm and the oxygen partial pressure of indium oxide. For this, use may be made of for example a mixture of CO and $CO_2$ or a mixture of $H_2$ and water vapour. A mixture of equal parts of CO and $CO_2$, similar to a mixture of equal parts of $H_2$ and water vapour, has an oxygen partial pressure at 1 atm which is a factor 10 higher than the equilibrium pressure of indium oxide. The pressure of the gas mixture may vary from some torr to 1 atmosphere or more. Said conditions are maintained for some seconds to some minutes.

Generally, the coating thickness of the heavily doped metal oxide filter is selected between 0.2 and $0.5 \mu m$, preferably between 0.3 and $0.4 \mu m$.

The interference filter consists of pairs of layers, each comprising a transparent layer of low refractive index and a transparent layer of high refractive index which is disposed at the side of said first-mentioned layer which is remote from the filament body. The number of layer pairs is at least 3, for reasons of economy preferably 4 or 5. The layer thicknesses are selected so that the wavelength at which reflection is a maximum lies between 0.7 and $1.2 \mu m$, preferably at $1.0 \mu m$, and that reflections in the visible spectral range are minimal. The first layer of low refractive index which is traversed by the radiation which is emitted by the lamp preferably has a thickness which is half the thickness of the other layers of low refractive index.

The interference filter may also be composed of two stacks, of which one stack consists of one or more, preferably 5 pairs of layers with a maximum reflection between 0.7 and 0.9, preferably $0.8 \mu m$, and the other stack of one or more pairs of layers, preferably 4, with a maximum reflection between 0.9 and $1.1 \mu m$. The two stacks may or may not be spatially separated.

In order to realize a maximum reflection over the widest possible spectral range using a minimum number of layer pairs, the substances of which the layer consist are preferably selected so that the refractive index of a substance with a high refractive index is at least 1.5 times greater than that of a substance with a low refractive index.

Examples of substances of which the layers of a low refractive index may be composed are $Na_3AlF_6$, $MgF_2$ and SiO$_2$, examples of substances with a high refractive index are ZnSe, ZnS and TiO$_2$.

The interference filter and the heavily doped metal oxide filter can be positioned in different ways relative to the lamp envelope. However, since the last-mentioned filter absorbs short-wave infrared radiation, the interference filter, which reflects said radiation, must be disposed at the side of the heavily doped metal oxide filter which is nearest the filament body.

Both filters may be disposed at the inside on the wall of the lamp envelope, or both at the outside, or one at the inside and the other at the outside.

In a special embodiment the lamp according to the invention is provided with a double-wall lamp envelope. The filters may then be disposed on the outer wall in the configuration described above, but both filters may alternatively be disposed at the inside. The attractive aspect of said embodiment is that the outer wall can be made detachable, so that the outer wall may be re-used when the incandescent lamp is to be replaced.

It is alternatively possible to dispose the interference filter at the outside of the inner wall and the second filter either at the inside or at the outside of the outer wall. When an interference filter is employed which consists of two stacks, one stack may for example be disposed at the outside of the inner wall and the second stack on the heavily doped metal oxide filter at the inside of the outer wall.

When a double-wall lamp envelope is employed, the space between the two walls may or may not be evacuated or filled with an inert gas or gas mixture.

When the two filters are not spatially separated, an adaptation layer of low refractive index, for example an MgF$_2$ layer of for example 0.24$\mu$m may be interposed between said filters.

The walls of the lamp envelope can be made of glass or quartz glass, while if one or both filters are disposed at the outside of a wall a glass or quartz-glass type is selected for said wall which is least absorbent for radiation which is reflected by the filter(s), for example quartz-glass or hard glass with a low OH-group content.

The lamp is filled with conventional gases and in usual amounts. When a high light output is aimed at, the invention is especially useful for halogen lamps, i.e. lamps with a tungsten filament body and a halogen-containing gas, which is capable of returning tungsten which has settled on the lamp envelope to the filament body.

However, the filament body may also consist of high-melting metals other than tungsten, metal carbides or nitrides, for example osmium, tantalum, rhenium, tantalum carbide, hafnium nitride.

The filament body may have different shapes. However, in the special embodiments of the lamp according to the invention, which aim both at elimination of thermal radiation and increased luminous efficiency, it is of importance that the shape of the filament body and the shape of the filters are adapted to one another. The filament body should be located in the optical centre of the filters. When these are spherical the filament body must be spherical, when the filters are cylindrical the filament body must be cylindrical. In said last-mentioned, preferred case the filament body may consist of a cylindrical tube or a helically wound strip or a helically wound wire or wire spiral.

To ensure that reflected thermal radiation hits the filament body it is essential that a filament body be wound so that when the filament body is projected on a plane parallel to the axis of the filament body the surface area of the filament body is not less than 75% of the surface area of the similarly projected, smallest enveloping cylinder of the filament body.

Spherical filament bodies may for example consist of wire or strip which is wound with an alternating diameter.

In a special embodiment the incandescent lamp according to the invention has an oblong lamp envelope of elliptical cross-section and two filament bodies which are mounted along the focal lines. In the present lamp the filters which are disposed on the walls of the single or double-wall lamp envelope reflect thermal radiation from one filament body to the other. The two filament bodies may be connected in an electrically conducting manner at or near one end of the lamp is such a way that they are connected in parallel or in series. When the elliptical cross-section of the lamp envelope of said lamps is selected so that the foci and thus the two filament bodies or the two parts of the filament body are situated near to each other, a pseudo-stripshaped filament body is obtained.

It may be advisable to dispose a total reflector at or near the end of an oblong lamp envelope in order to prevent less of energy. In the case of spherical lamps such a reflector may be disposed near the lamp base.

In a different, special embodiment of the incandescent lamp according to the invention the lamp envelope has an oblong, flat or — for example hyperbolically — curved wall portion provided with infrared filters, which portion is adjoined by a elliptically or parabilically curved reflecting wall portion, which envelope is closed by reflecting wall portions at the ends. In said lamp the filament body is shaped in accordance with the focal line of the curved reflecting wall portion.

In said embodiment the filament body may be surrounded by a inner, for example cylindrical, lamp envelope. Said embodiment may combine the advantages of elimination of thermal radiation, a directional light beam and, specifically for the lamp with an elliptical wall portion, a high luminous efficiency, when the wall portion of the lamp envelope are disposed so that the major axis of the elliptical wall portion or the axis of the parabolic wall portion perpendicularly intersects the wall portion which is provided with filters.

In a different embodiment the incandescent lamp according to the invention has a lamp envelope with an elliptically or parabolically curved, rotationsymmetrical reflecting wall portion which is closed by a wall portion provided with infrared filters which is perpendicular to the major axis of the ellipse or the axis of the parabola.

The wall portions may be provided with a reflector coating in a conventional manner, for example with aluminium.

The invention will now be described in more detail with reference to Figures and examples.

Figure 1:
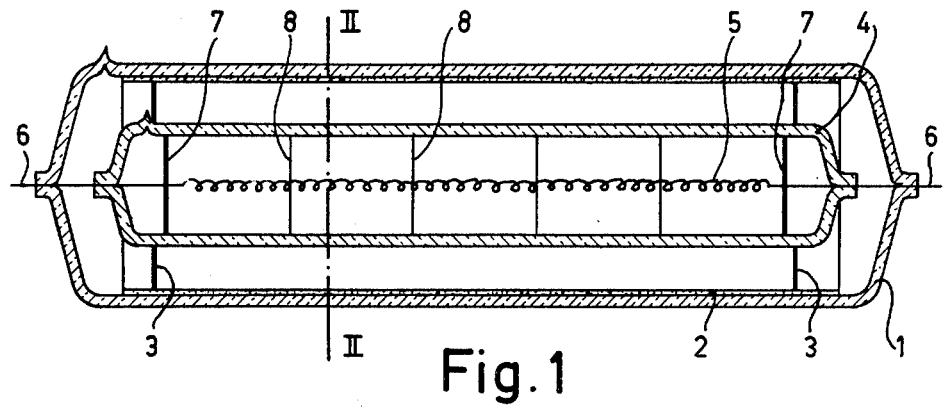
FIG. 1 shows a longitudinal section of a lamp.
Figure 2:
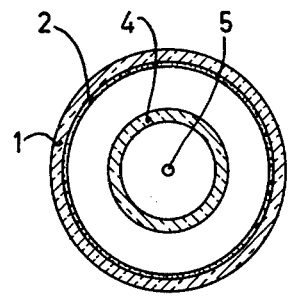
FIG. 2 is a cross-section taken at II—II.
Figure 8:
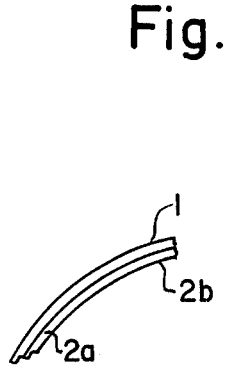
FIG. 8 is a cross section to an enlarged scale of a portion of the filter shown in FIG. 2.

In FIGS. 1, 2 and 8 the reference numeral 1 is an outer lamp envelope, which at the inside is provided with a filter 2 layered which reflects infrared radiation which has layers 2a and 2b. The wall of the lamp envelope is first provided with a heavily doped metal oxide filter 2a, on which an interference filter 2b is disposed. In view of the small thickness of said filters they are together denoted by the reference numeral 2 in FIG. 2. Reflecting rings 3 centre the inner lamp envelope 4 within the outer envelope. The filament body 5 is connected to current lead-throughs 6 and is positioned by reflecting discs 7 and spirally wound lengths of wire 8.

The reference numerals in FIG. 2 refer to the same parts as in FIG. 1.

Figures 3, 4:
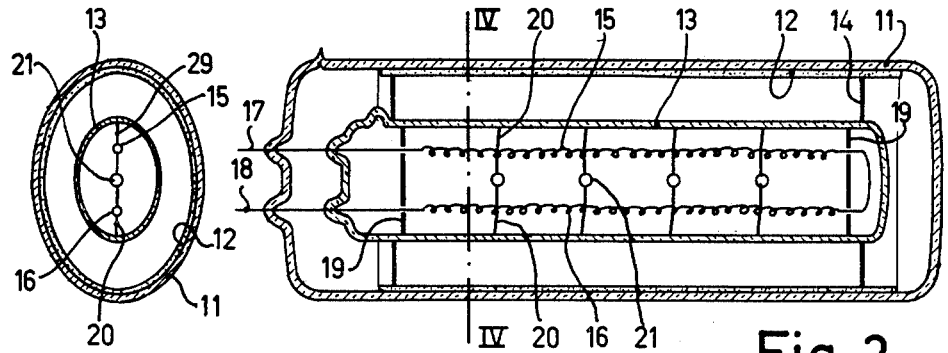
FIG. 3 shows a longitudinal section of an elliptical lamp.
FIG. 4 shows the cross-section taken at IV—IV.

In FIGS. 3 and 4 the reference numeral 11 denotes the outer, elliptical lamp envelope which is lined with a heavily doped metal oxide filter and subsequently with an interference filter, together designated 12.

The elliptical inner lamp envelope 13 is centred by means of reflecting discs 14. The filament bodies 15 and 16 which are shaped in accordance with the focal lines of the ellipses, are connected in series and are connected to the lead-throughs 17 and 18. Reflecting discs 19 position the filament bodies and the supports 20, of for example tungsten wire, which are retained in pairs by a quartz-glass bead 21.

Figure 6:
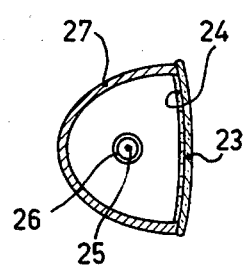
FIG. 6 shows a cross-section taken at VI—VI.
Figure 5:
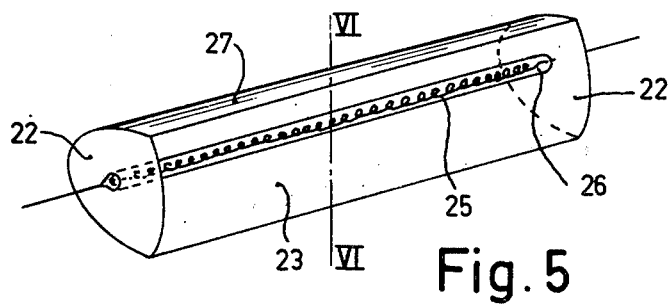
FIG. 5 is a perspective drawing of a lamp with an elliptically curved reflecting wall portion.

In FIGS. 5 and 6 the reference numeral 27 denotes a reflecting elliptically curved wall portion with reflecting end faces 22. Reference numeral 23 denotes a hyperbolically curved wall portion which is provided with a heavily doped metal oxide filter and then with an interference filter — together designated 24 —. The filament body 25 is surrounded by a inner lamp envelope 26 of cylindrical shape.

Figure 7:
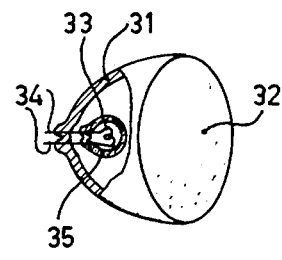
FIG. 7 is a perspective drawing of a lamp with a rotation-symmetrical, elliptically curved, relfecting wall portion.

In FIG. 7 the reference numeral 31 denotes a rotation-symmetrical elliptically curved, reflecting wall portion which adjoins a wall portion which is provided with infrared filters. A filament body 33 with feedthroughs 34 is surrounded by a substantially spherical inner lamp envelope.

EXAMPLES

1. A lamp was made with sections as shown in FIGS. 1 and 2 comprising a tungsten wire spiral as filament body, a quartz-glass inner bulb and a hard-glass outer bulb.

The tungsten wire had a diameter of 0.0256 cm. The spiral was wound on a mandrel with a diameter of 0,1250 cm. The pitch of the spiral was 0.0308 cm. The spiral had a length of 20 cm.

The inner diameter of the inner bulb was 1.4 cm, that of the outer bulb was 4.0 cm. The wall thickness of the two bulbs was 0.1 cm. The distance between the two end reflectors (3 and 7) was 25 cm.

The inner bulb was filled with argon with a pressure of 2 atm., the outer bulb with nitrogen of 800 torr.

The infrared relfecting layer (2) was composed as follows: on the glass a layer was disposed of $0.3\mu$um thickness of tin-doped indium oxide with a free-electron density of $1.3 \times 10^{21}$ cm$^{-3}$ and a plasma wavelength of $1.1\mu$um, on which were disposed: first of all $MgF_2$ $0.236\mu$um (refractive index 2.30), $MF_2$ $0.185\mu$um, ZnS $0.104\mu$um, $MgF_2$ $0.174\mu$um, ZnS $0.104\mu$um, $MgF_2$ $0.185\mu$um, ZnS $0.117\mu$um, and $MgF_2$ $0.101\mu$um, together forming an interference filter.

2. A lamp was made without end relfectors (3 and 7) but further identical to the lamp of Example 1.

The following table inter alia specifies the efficiency of said lamps. For comparison, specifications are given of an identical lamp without infrared reflecting filters (2) and without end reflectors (3 and 7) (lamp A). For further comparison specifications are included which relate to an identical lamp with end reflectors but exclusively with an interference filter as described in British patent specification No. 834,087 as infrared reflecting filter (lamp B), and furthermore specifications relating to a lamp with a titanium oxide layer as described in British patent specification No. 703,127 at the outer side of the inner bulb instead of the two infrared reflecting filters (2) (lamp C). It is to be noted that a filter at the inner bulb yields more favourable results than a filter at the outer bulb, so a comparison of lamps according to the invention with the last-mentioned lamp is comparatively unfavourable for lamps according to the invention.

TABLE

| lamp | temp. filam. body ° K | power consump. W | operating voltage W | Efficiency lm/w |
| --- | --- | --- | --- | --- |
| example 1 | 3000 | 937 | 230 | 50.3 |
| example 2 | 3000 | 1074 | 245 | 44.9 |
| lamp A | 3000 | 2073 | 340 | 23.5 |
| lamp B | 3000 | 1566 | 295 | 34.2 |
| lamp C | 3000 | 1665 | 305 | 29.4 |

What is claimed is:

1. An electric incandescent lamp which comprises a filament body, a lamp envelope, a gas filling and a filter which is transparent to visible light and which reflects infrared radiation, said filter, being transparent to visible light and reflecting infrared radiation, comprise an interference filter and a heavily doped metal oxide filter with a plasma wavelength smaller than $1.4\mu$um, which is disposed at the side of said interference filter which is remote from the filament body.

2. An electric incandescent lamp as claimed in claim 1, wherein the filament body is disposed in the optical centre of the filter which reflects infrared radiation.

3. An electric incandescent lamp as claimed in claim 1 including a heavily doped metal oxide filter indium oxide which is doped with at least 7, at. per cent of tin calculated for indium, which has a free-electron density of at least $10^{21}$ cm$^{-3}$, and a layer thickness of between 0.2 and $0.5\mu$um.

4. An electric incandescent lamp as claimed claim 1 wherein the interference filter consists of at least 3 layer pairs, each consisting of a transparent layer of low refractive index and a transparent layer of high refractive index and that the wavelength at which reflection is a maximum lies between 0.7 and 1.2.

5. An electric incandescent lamp as claimed claim 1 wherein the interference filter consists two stacks, of which one stack comprises one or more layer pairs with a maximum reflection between 0.7 and $0.9\mu$um and the other stack comprises one or more layer pairs with a maximum reflection between 0.9 and $1.3\mu$um, each layer pair consisting of a transparent layer of low refractive index and a transparent layer of high refractive index.

6. An electric incandescent lamp as claimed in claim 5, wherein the two stacks of the interference filter are spatially separated.

7. An electric incandescent lamp as claimed in claim 1 wherein the heavily doped metal oxide filter and the interference filter are separated by an adaptation layer of low refractive index.

8. An electric incandescent lamp as claimed in claim 1, wherein the lamp comprises a double-wall lamp envelope and that the interference filter and the heavily doped metal oxide filter are both disposed at the outer wall.

9. An electric incandescent lamp as claimed in Claim 8, wherein the two filters are disposed at the inner side of the outer wall.

10. An electric incandescent lamp as claimed in claim 1, wherein the lamp envelope and the filament body are cylindrical.

11. An electric incandescent lamp as claimed in claim 10, wherein the lamp comprises a total reflector near the end faces.

12. An electric incandescent lamp as claimed in claim 1 wherein the lamp envelope has an oblong wall portion which is provided with infrared filters, which portion adjoins an elliptically or parabolically curved reflecting wall portion in such a way that the major axis of the reflecting wall parabola perpendicularly intersects the first wall portion, which lamp envelope is closed at the ends by reflecting wall portions, and that the filament body is shaped in accordance with the focal line of the curved wall portion.

13. An electric incandescent lamp as claimed in Claim 12, wherein the lamp envelope is double-walled and that the inner wall is cylindrical.

14. An electric incandescent lamp is claimed claim 1 wherein the lamp envelope has a rotation-symmetrical, elliptically or parabolically curved reflecting wall portion, which adjoins a wall portion which is provided with infrared reflecting filters in such a way that the (major) axis of the reflecting wall portion perpendicularly intersects the wall portion which is provided with filters, and that the filament body is disposed in the focus of the reflecting wall portion.

* * * * *

UNITED STATES PATENT OFFICE
CERTIFICATE OF CORRECTION

Patent No. 4017758                Dated April 12, 1977

Inventor(s) FRIEDRICH H. R. ALMER ET AL

It is certified that error appears in the above-identified patent and that said Letters Patent are hereby corrected as shown below:

Column 1, line 41, "flter" should be deleted and insert --filter--;

Column 2, line 16, delete "substrte" and insert --substrate--.

Column 5, line 5, delete "filter 2 layered" and insert --layered filter 2--.

Column 6, line 1, delete "relfector" and insert --reflectors--.

In the Claims:

Claim 1, line 4, after "filter" delete ",";

line 5, delete "," and also delete "comprise" and insert --comprises--.

Claim 12, line 6, delete "parabola" and insert --portion--.

Signed and Sealed this

Second Day of January 1979

[SEAL]

Attest:

RUTH C. MASON
Attesting Officer

DONALD W. BANNER
Commissioner of Patents and Trademarks